United States Patent [19]
Suzuki et al.

[11] Patent Number: 5,541,763
[45] Date of Patent: Jul. 30, 1996

[54] OPTICAL SCANNING DEVICE WITH LENS-HOLDER

[75] Inventors: Tsuneo Suzuki, Mönchweiler; Raimund Rösler, Triberg; Stefanie Köser, Tennenbronn; Günter Hauser, Niedereschach; Olaf Laser, Villingen-Schwenningen; Peter Looser, St. Georgen, all of Germany; Shunichi Maruyama, Kawasaki, Japan

[73] Assignee: Deutsche Thomson-Brandt GmbH, Villingen-Schwenningen, Germany

[21] Appl. No.: 211,821

[22] Filed: Sep. 19, 1994

[30] Foreign Application Priority Data

Oct. 22, 1991 [DE] Germany ............... 41 34 803.6

[51] Int. Cl.$^6$ ............... G02B 26/08; G02B 7/02
[52] U.S. Cl. ............... 359/298; 359/814
[58] Field of Search ............... 359/298, 814

[56] References Cited

U.S. PATENT DOCUMENTS

| | | | |
|---|---|---|---|
| 4,664,476 | 5/1987 | Kasuga ............... | 350/252 |
| 4,752,117 | 6/1988 | Ichikawa et al. ............... | 350/247 |
| 4,863,240 | 9/1989 | Nakajima et al. ............... | 350/247 |
| 4,978,844 | 12/1990 | Ujihara ............... | 250/216 |
| 5,241,424 | 8/1993 | Watanabe ............... | 359/811 |
| 5,289,318 | 2/1994 | Sekine et al. ............... | 359/813 |
| 5,428,481 | 6/1995 | Ikegame et al. ............... | 359/811 |

FOREIGN PATENT DOCUMENTS

| | | | |
|---|---|---|---|
| 0144445 | 6/1985 | European Pat. Off. ......... | G11B 7/08 |
| 0287235 | 10/1988 | European Pat. Off. ......... | G11B 7/08 |
| 0379757 | 1/1990 | European Pat. Off. ......... | G11B 7/08 |
| 1212206 | 10/1966 | Germany . | |
| 2643588 | 4/1977 | Germany ............... | G11B 7/08 |
| 2760266 | 11/1977 | Germany ............... | G11B 7/08 |

OTHER PUBLICATIONS

Patent Abstracts Of Japan, vol. 10, No. 324, 5 Nov. 1986 & JP,A,61 131243, Fujitsu, Ltd., 18 Jun. 1986.

*Primary Examiner*—Mark Hellner
*Attorney, Agent, or Firm*—Joseph S. Tripoli; Eric P. Herrmann; James B. Hayes

[57] ABSTRACT

In optical playback appliances, such as CD-players, the objective lens sits on a lens-holder that is mounted so as to swivel around an axis and that carries at least one coil. The axis of rotation of the lens-holder is secured to a housing. To allow the lens-holder (LH) to move easily, without being hampered by wires, in the optical scanning device, essentially composed of the lens-holder (LH) and the housing (G), the current required for the coils (S1, S2) flows through respective elastic, electroconductive fastening elements (FO, FU) to both ends (SO, SU) of the axis (N), and from said ends (SO, SU), electrically isolated from each other, to the coils (S1, S2), via respective strip conductors (LPO, LBU) on the lens-holder (LH). This optical scanning device with a lens-holder is useful in CD-players, video disk players, DRAW-disk players and in magneto-optical recorders and players.

11 Claims, 2 Drawing Sheets

OPTICAL SCANNING DEVICE WITH LENS-HOLDER

The present invention relates to an optical scanning device with a lens holder supported rotatably about an axle and at whose one end is disposed a lens.

BACKGROUND OF THE INVENTION

Optical scanning devices of this type are used, for example, in CD players in order to be able to read by means of a light beam the data of an optical compact disc, a so-called CD.

An objective lens by means of which a light beam is focused onto the disk, is seated on a lens holder supported rotatably about an axle so that the objective lens is movable in the radial direction with respect to the disk. The lens holder is fastened rotatably on a housing which is movable in the radial direction with respect to the disk. It is known, for example, to place the housing on a spindle so that by rotating the spindle it can be moved in the radial direction over the data tracks of the disk. This mechanism, most often referred to as coarse drive, serves for the purpose of being able to position the objective lens over any desired data track of the disk. Because of the rotational motion of the lens holder, already described, relative to the housing the objective lens can be positioned more precisely or more finely over the data tracks. This is therefore referred to as a so-called fine drive.

The vertical motion along the optical axis of the objective lens and the rotational motion of the lens holder are brought about by means of coils which are disposed either on the housing, on the lens holder or on both parts. Most frequently magnets are provided as counter parts to the coils in order to generate a magnetic force between the coils and the magnets.

Several demands are made simultaneously of optical scanning devices of this type: so that low magnetic forces already effect a lifting and a rotational motion of the objective lens, the lens holder should be of low mass and should be readily rotatable as well as readily movable in the up and down direction.

If the coils are seated on the movable lens holder, electrical wires must be provided as feed lines. But these wires increase not only the weight of the lens holder, they also increase the mechanical resistance against the rotational and lifting motions of the lens holder because they limit its movability. Lastly, it should be possible to produce the optical scanning device cost-effectively in series.

It is therefore the task of the invention to implement an optical scanning device with a lens holder which is rotatable about an axle and at whose one end is seated a lens in such a way that it can be produced cost-effectively and so that its lens holder is distinguished by low mass and low mechanical friction.

SUMMARY OF THE INVENTION

The invention solves this task thereby that the two ends of the axle are supported electrically conducting on an electrically conducting elastic fastening element, that the two fastening elements are fastened on a housing, that at the end opposing the lens of the lens holder at least one coil is disposed, that the two ends of the axle are indeed electrically conducting but electrically insulated with respect to one another, that the current flows from a voltage source to the coil via the upper fastening element and the upper end of the axle, and from the coil via the lower end of the axle and the lower fastening element back to the voltage source.

DETAILED DESCRIPTION OF THE DRAWING

The invention will be explained in the following in conjunction with the embodiment example depicted in FIGS. 1, 2, and 3.

Figure 1:
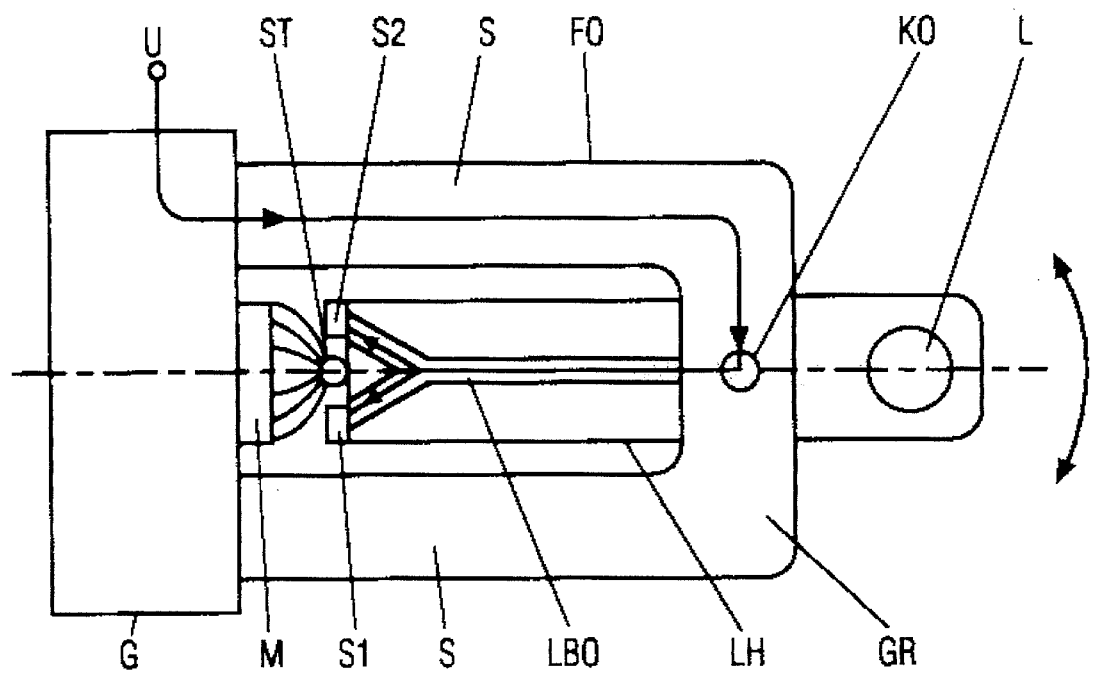
FIG. 1 an embodiment example of the invention in top view.

In FIG. 1 the upper fastening element FO, which is implemented for example as a leaf spring, has the form of a shackle. A shank S of the bow-shaped upper leaf spring FO is fastened on a housing G. In the center of a handle GR of the upper leaf spring FO is disposed a conical bearing KO for a needle N provided as the rotational axle. Under the upper leaf spring FO is located a lens holder LH, at whose one end is seated an objective lens L. Lens holder LH is supported rotatably by means of needle N between the upper leaf spring FO and a lower leaf spring FU, which is not shown in FIG. 2.

At the other end of lens holder LH are disposed two coils S1 and S2. A magnet M is fastened on the housing G opposite the coils S1 and S2. On the upper side of lens holder LH extends a printed conductor LBO from the needle N to the two coils S1 and S2. Between the two coils S1 and S2 is disposed a metal pin ST.

Figure 2:
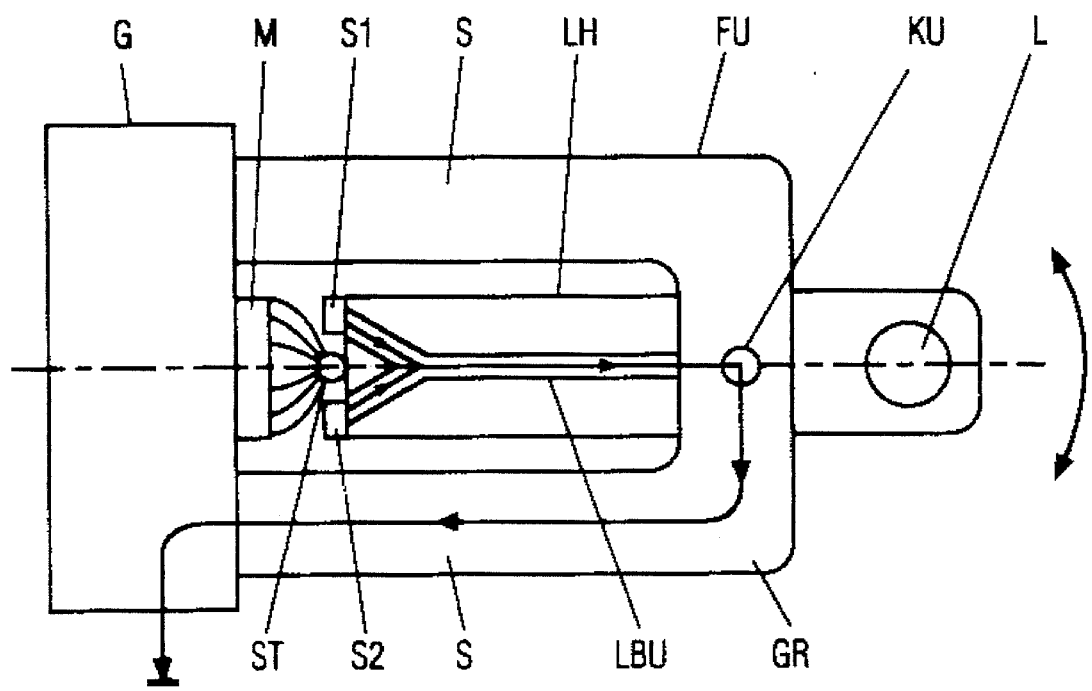
FIG. 2 the embodiment example from below.

FIG. 2 shows the embodiment example from below. Both shanks S of the lower leaf spring FU provided as the lower fastening element are also fastened on housing G. In the center of handle GR of the lower leaf spring FU is also provided a conical bearing KU for the needle N as was the case with the upper leaf spring FO. On a shank S of the lower leaf spring FU is provided a ground terminal. As is the case on the upper side, on the lower side of the lens holder LH an electric printed conductor LBU leads from the needle N to the coils S1 and S2.

Figure 3:
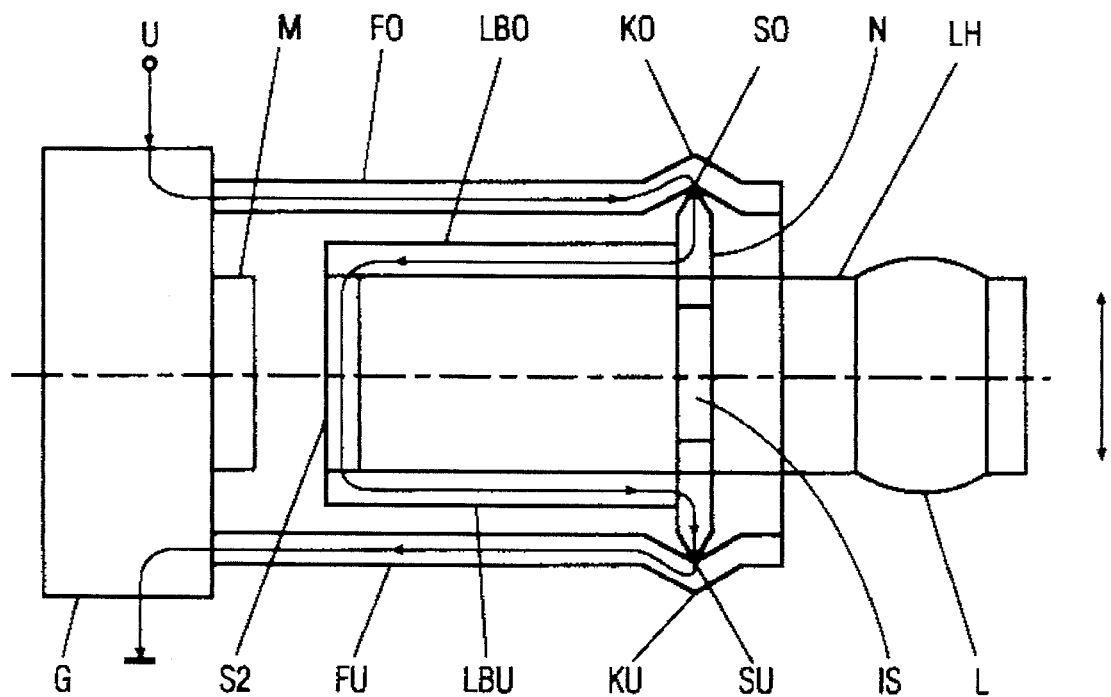
FIG. 3 the embodiment example in side view.

FIG. 3 depicts the embodiment example in side view.

The upper leaf spring FO and the lower leaf spring FU are fastened on the housing G. The magnet M is fastened on housing G between the fastening points of the two leaf springs FO and FU. The needle N, whose upper tip SO is supported in a bearing KO of the upper leaf spring FO and whose lower tip SU in bearing KU of the lower leaf spring FU, carries the lens holder LH at whose one end is seated the objective lens L and whose other end, opposite magnet M, carries the coils S1 and S2.

The tips SO and SU of needle N are fabricated of an electrically conducting material and insulated from one another by means of an insulator IS. On the upper leaf spring FO or on housing G is provided a terminal for a voltage source U, from which the current flows via the upper leaf spring FO, its bearing KO, the upper tip SO of needle N, and the printed conductor LBO on the upper side of lens holder LH to the coils S1 and S2. The current flows from coils S1 and S2 via the printed conductor LBU on the under side of light [sic] holder LH, the lower tip SU of needle N, the bearing KU of the lower leaf spring SU and the lower leaf spring FU to a ground terminal which is either provided on the lower leaf spring FU or on its fastening point on housing G.

By applying current to coils S1 and S2 the lens holder LH can be rotated about needle N as the rotational axle to the left or the right as a function of the direction of current. The metal pin ST which is disposed in the center between the two coils S1 and S2, keeps the lens holder LH in a center position when the coils are without current, because between it and the magnet a force effect is generated.

Since the upper and the lower leaf spring FU and FO not only connect the lens holder LH mechanically with the housing G, but simultaneously also serve as electrical conduction for the coil current, any additional wires which increase the friction resistance and the mass of the lens holder LH are no longer required. The invention therefore meets the demands for lower mass and lower friction.

Since the invention comprises only a few readily producible simple parts, it can be produced easily and cost-effectively. Since the current supply of the coils takes place via the fastening elements—the two leaf springs—it is no longer required to solder wires to the movable lens holder LH. Therewith is also fulfilled the demand for ready manufacturability.

Since elastic fastening elements—two leaf springs—are provided for fastening the lens holder, the objective lens L can also be moved in the direction of its optical axis in order to be able to focus the light beam onto the disk. The coils S1 and S2, disposed on one end of the lens holder LH, in cooperation with the magnet M can therefore either serve for rotating the lens holder LH for track guidance about the axle N or to move the objective lens L along its optical axis for the purpose of focusing.

The configuration depicted in FIGS. 1, 2, and 3 is an embodiment example. The elastic fastening elements as well as the bearing can be of any desired form. What is critical is that the current for the coils flows across the bearing and the fastening elements so that electrical feed lines become superfluous.

The invention is suitable for optical playback devices and magneto-optical recording and/or playback devices. Examples of these are CD players, DRAW-DISC players and video disk players.

We claim:

1. An optical scanning device, comprising:
a lens holder which is rotatably supported by an axle; the two ends of the axle are composed of an electrically conducting material in electrical contact with an electrically conducting elastic fastening element which is secured to a housing; at least one electrical coil is mounted on said lens holder for varying the position thereof; and an electrically insulating means is disposed between the ends of said axle, such that the current from a voltage source flows through a first portion of said fastening element and one end of said axle to said coil and from said coil through the other end of said axle and a further portion of said fastening element.

2. The optical scanning device of claim 1, wherein;
said axle further comprises two tips and said fastening element includes a pair of needle bearings each respectively supporting one of said axle tips.

3. The optical scanning device of claim 2, wherein;
said fastening element comprises two leaf springs.

4. The optical scanning device of claim 3, wherein;
said two leaf springs are bow-shaped and each contain a shank portion and a handle portion.

5. The optical scanning device of claim 4, wherein;
the shank portion of the bow-shaped leaf springs are fastened to said housing and wherein said bearings for the axle are provided in the handle portion of the respective leaf springs.

6. The optical scanning device of claim 1, wherein;
said lens holder has, a first printed conductor extending between one end of the axle and said at least one coil and a second printed conductor extending between said at least one coil and the other end of said axle.

7. The optical scanning device of claim 1, wherein;
said lens holder is an elongated member having a lens seated at one end and said at least one coil is disposed at the other end thereof.

8. The optical scanning device of claim 1, wherein;
a magnet is mounted on the housing and disposed opposite said at least one coil.

9. The optical scanning device of claim 8, wherein;
a pin comprising ferroelectric material is mounted on said lens holder and oriented with respect to said magnet such that due to the magnetic force between said magnet and said pin, the lens holder is disposed in a center position in the absence of coil current.

10. The optical scanning device of claim 9, wherein;
said pin is disposed between a pair of coil members on said lens holder.

11. The optical scanning device of claim 10, wherein;
said pin is a metal pin with a circular cross section.

* * * * *